(12) United States Patent
Shih et al.

(10) Patent No.: US 6,319,299 B1
(45) Date of Patent: Nov. 20, 2001

(54) ADJUSTABLE COLD TRAP WITH DIFFERENT STAGES

(75) Inventors: Shih-Min Shih, Hsin-Shih Village; Kun-Lin Huang, Hsin-chu, both of (TW)

(73) Assignee: Vanguard International Semiconductor Corporation, Hsin-chu (TW)

( * ) Notice: Subject to any disclaimer, the term of this patent is extended or adjusted under 35 U.S.C. 154(b) by 0 days.

(21) Appl. No.: 09/537,479

(22) Filed: Mar. 30, 2000

(51) Int. Cl.[7] ....................................... B01D 8/00
(52) U.S. Cl. ................ 55/434.2; 55/444; 55/DIG. 15
(58) Field of Search ............................. 55/434.2, 434.3, 55/434.4, 442, 443, 444, 436, DIG. 15; 95/288; 34/73

(56) References Cited

U.S. PATENT DOCUMENTS

| | | | |
|---|---|---|---|
| 2,162,550 | * | 6/1939 | Frankford . |
| 2,581,134 | * | 1/1952 | Odell . |
| 3,137,551 | * | 6/1964 | Mark . |
| 3,315,445 | * | 4/1967 | De Seversky . |
| 3,410,100 | * | 11/1968 | Carlson . |
| 3,785,162 | * | 1/1974 | Long et al. ............... 55/DIG. 15 |
| 4,749,030 | * | 6/1988 | Knox, Jr. ............... 165/111 |
| 5,813,451 | * | 9/1998 | Chawla . |
| 5,904,757 | * | 5/1999 | Hayashi et al. ............... 55/444 |
| 5,928,426 | * | 7/1999 | Aitchison ............... 55/434.4 |
| 6,063,197 | * | 5/2000 | Cox et al. ............... 55/434.2 |

* cited by examiner

Primary Examiner—David A. Simmons
Assistant Examiner—Frank M. Lawrence
(74) Attorney, Agent, or Firm—George O. Saile; Stephen B. Ackerman

(57) ABSTRACT

A new three-stage cold trap configuration is provided that allows for significantly improved cold trap efficiency and reduced Preventive Maintenance of the cold trap. The cold trap of the invention is provided with three stages that are used for the removal of impurities from processing gasses after they have been released from a processing chamber. The spaces between the three plates of the cold trap are not the same while the angle under which the gas impacts the plates differs from conventional cold trap designs. The three plates of the cold trap are furthermore adjustable, making the design of the cold trap of the invention flexible and readily applicable to a range of cold trap requirements.

5 Claims, 2 Drawing Sheets

ADJUSTABLE COLD TRAP WITH DIFFERENT STAGES

BACKGROUND OF THE INVENTION

(1) Field of the Invention

The invention relates to the fabrication of integrated circuit devices, and more particularly, to a new cold trap apparatus that is aimed at improving cold trap efficiency and improved operational characteristics.

(2) Description of the Prior Art

Trap devices are typically used together with vapor phase reaction apparatus. One of the most frequently applied processes that belongs to the vapor phase reaction class is the Chemical Vapor Deposition (CVD) process as part of which the gas that is used to perform the vapor deposition is removed from the deposition chamber and as such is included in the exhaust gas of the chamber. The level of gasses that are removed from the treatment chamber is, as part of a semiconductor manufacturing environment, controlled and captured by devices through which these gasses pass after being expulsed (by a vacuum pump) from the treatment chamber. The device that serves the function of capturing vacuum chamber treatment gasses is mostly connected between the chamber outlet and the vacuum pump that is used to pump residue gasses from the vacuum chamber. One of the reasons for removing residue gasses in this manner is to protect the vacuum pump from excessive wear that can be caused by the gasses that pass through it. The generic name for the devices that remove gasses from a gas stream is trap devices.

The principle that is most frequently used underlying the operation of the trap devices is cooling the gas that is to be cleaned and, in so doing, causing residue to accumulate inside the trap device from which these residues can readily be removed. The trap device therefore is typically equipped with a series of plates that are kept under temperature control and that intercept and react with the gasses that flow through the trap device and that come into contact with the series of plates. The plates are kept in a hermetically sealed container or vessel. The purpose of the plates within the trap device is to expose the gas that passes through the device to a particular temperature over as long a period of time as possible, the degree to which the trap device succeeds in doing this determines the cooling efficiency of the trap device. It is clear that it must be the objective of the design of any trap device to maximize the cooling efficiency of the device, this in combination with having a trap device that is not subject to undue damage as a result of its operation while the trap device must be cheap to operate and not be prone to frequent operational interruptions due to maintenance. In short: a trap device must be cheap to acquire and cheap to operate, have a high cooling efficiency, easy to clean and be sturdy enough that its operational lifetime is acceptable.

A number of trap devices increase their efficiency by not only keeping the plates that are mounted inside the trap as operational parts of the trap, but by further increasing the temperature difference between the gasses that impact the plates and the gasses. This is accomplished by heating the gasses before they impact the plates of the trap device. The heating trap can in effect already remove certain components from the exhaust gasses and can trap these components due to the fact that these components can adhere to the coils of the heating trap from where they can be removed. It is thereby again required that the heating surfaces over which the gasses pass must be maximized and that the process of heat exchange is optimized so that the maximum number and amount of components can be removed from the gasses. It is clear that the speed with which the gasses pass through heating and cooling gasses is of importance in determining the overall efficiency of the trap device.

It is further clear that trap devices can be designed for and aimed at treating exhaust gasses that are derived from particular processes since different processes will use different processing gasses for, for instance, the processes of various types of etching, vapor deposition and the like. These differences demonstrate themselves in different components that are contained in the exhaust gasses, in different concentrations of these components in the gasses and in different reactions of the exhaust gasses to sudden induced heating and cooling. It is therefore to be expected that a variety of trap devices are available, whereby each type of this variety is aimed at and best applied in a particular processing environment. To further complicate the application of trap devices, a number of chemical substances (for instance residual monomer vapor) can best be removed by passing the gasses through a filter that removes these components without the benefit of a rapid change in temperature of the gasses. This removal of a target component is, in most cases, not complete so that the gasses that have passed through the filter may need further treatment.

Of importance in the design of a trap device is also the design of the angle or angles under which the gas that passes through the device impacts the heating and/or cooling plates or coils. In many of the conventional designs, the heat exchanging sections are created in coil form, whereby the cooling or heating is provided by fluid that flows through the coils. This makes pumps, that are required to move the fluids through these coils, an integral part of the design of the trap device, this in addition to the type and heat exchange characteristics of the fluids that are used as the cooling or heating medium. As yet another design parameter for trap devices, the flow of the gasses that pass through the trap device can be controlled in either a passive (gravitational flow) or an active manner thereby providing yet another adjustment that can be used for improved efficiency of the trap device.

SUMMARY OF THE INVENTION

A principle objective of the invention is to improve the efficiency of the cold trap that is used to purify exhaust gasses that are released from processing chambers.

Another objective of the invention is to provide a cold trap that does not rapidly accumulate deposits from the gasses that are passed through the trap and that therefore does not readily plug up with these accumulated deposits.

Another objective of the invention is to provide a cold trap that has a multiplicity of plates and that can therefore be adjusted to different operational environments.

It is another objective of the invention to provide a cold trap that has improved operational efficiency.

It is another objective of the invention to provide a cold trap that does not require frequent Preventive Maintenance for purposes of cleaning the cold trap.

In accordance with the objective of the invention, a pew three-stage cold trap configuration is provided that allows for significantly improved cold trap efficiency and reduced Preventive Maintenance of the cold trap. The cold trap of the invention is provided with three stages that are used for the removal of impurities from processing gasses after they have been released from a processing chamber. The spaces between the three plates of the cold trap are not the same while the angle under which the gas impacts the plates differs from conventional cold trap designs. The three plates of the cold trap are furthermore adjustable, making the design of the cold trap of the invention flexible and readily applicable to a range of cold trap requirements.

DESCRIPTION OF THE PREFERRED EMBODIMENTS

Figure 1:
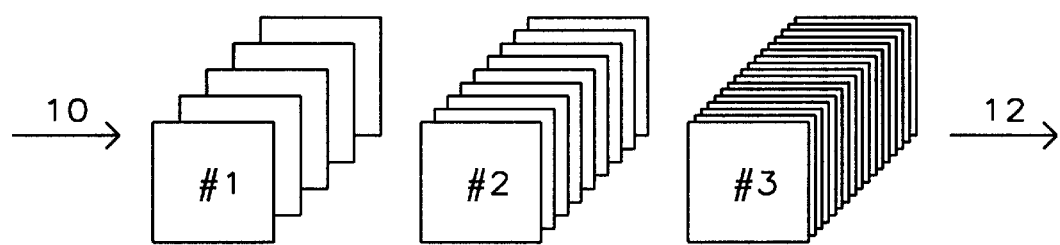
FIG. 1 shows a three-dimensional view of the three-stage plate arrangement that is used in the cold trap of the invention.

Conventional cold trap designs are designs of fixed trap space, that is the cold traps are designed such that the cubic content of the space, through which the gasses that are being cleaned can pass, is of a fixed value. This results in relatively poor efficiency of the cold trap while the cold trap cannot be readily adapted to a variety of processing environments or processing requirements. In addition, the conventional cold trap is prone to rapid accumulation of the impurities that are removed from the gasses that flow through the trap, resulting in frequent interruption of cold trap operations so that Preventive Maintenance can be performed for the removal of the impurity concentrations from the cold trap. The cold trap of the invention is typically used in TEOS operation, this will be further addressed below.

The currently used cold trap can readily remove discrete particles from gasses that flow through the trap, the trap however is not well suited for the removal of gaseous substances from the gasses that flow through the trap. Also, the presently used cold trap readily plugs up leading to the already indicated requirement for a high level of PM.

The cold trap design of the invention uses loose leaves that directly interface with the gasses that pass through the trap, this loose leave design results in a cold trap where the power that is supplied to the cold trap can be adjusted in small increments thereby increasing the efficiency of the cold trap and reducing the accumulation of deposits inside the cold trap.

The chemical reaction that takes place inside the cold trap can be explained as follows. TEOS contains within its composition the following elements: $Si(OC_2H_5)_4$ or $Si(OR)_4$ where $R=C_2H_5$. The reaction of TEOS proceeds in accordance with the following formula:

whereby some TEOS reactions have the property that initially the substance congeals.

The plates of the cold trap of the invention are implemented as three different and distinct clusters of plates that are separated by a measurable distance. These three clusters of plates provide levels of effectiveness within the cold trap that are not identical. The first interval is the most effective, the second interval comes next while the third interval is the least effective. However, the flow of the gas thought the cold trap and the cleaning properties of the cold trap is most effective during the first step of the cold trap where additional power can be provided to the cold trap. The power dissipates from the first stage to the second stage whereby an adequate level of power is maintained inside the cold trap up through the third stage. The third stage is the least effective stage since the interval of the third stage is very small where coolant has been accumulated that provides most of the power.

The PM procedure can be implemented as follows: the power that has been provided to the first, the second and the third stage is observed together with the accumulated power within the cold trap. From this observation, adjust (increase or reduce) for each stage of the cold trap the power that is to be supplied to that stage thereby establishing a balance of power and of operational efficiency within the cold trap.

It is further possible to adjust the three (grooved) plates of the cold trap, which allows for the reduction in the cleaning power of the small trap.

The time delay that is required between PM procedures can be established by optimizing the efficiency of the cold trap.

Referring now specifically to FIG. 1, there is shown an arrangement of three clusters of plates that have been highlighted as cluster #1, #2 and #3 respectively. Gas flow 10 enters the three clusters from the left and exits (12) after the gas has passed through all three clusters in the sequence of #1, #2 and #3. The relative positioning of the plates that make up the three clusters is not of significance in the presentation of FIG. 1, this relative positioning will become more apparent in subsequent drawings. It must however be observed from FIG. 1 that the number of plates that are contained within each cluster increases when proceeding from cluster #1 to cluster #2 to cluster #3 whereby cluster #1 has the lowest number of plates while cluster #3 has the highest number of plates. The surface areas of the plates that belong to the different clusters are essentially the same as is the thickness of these plates.

Figure 2:
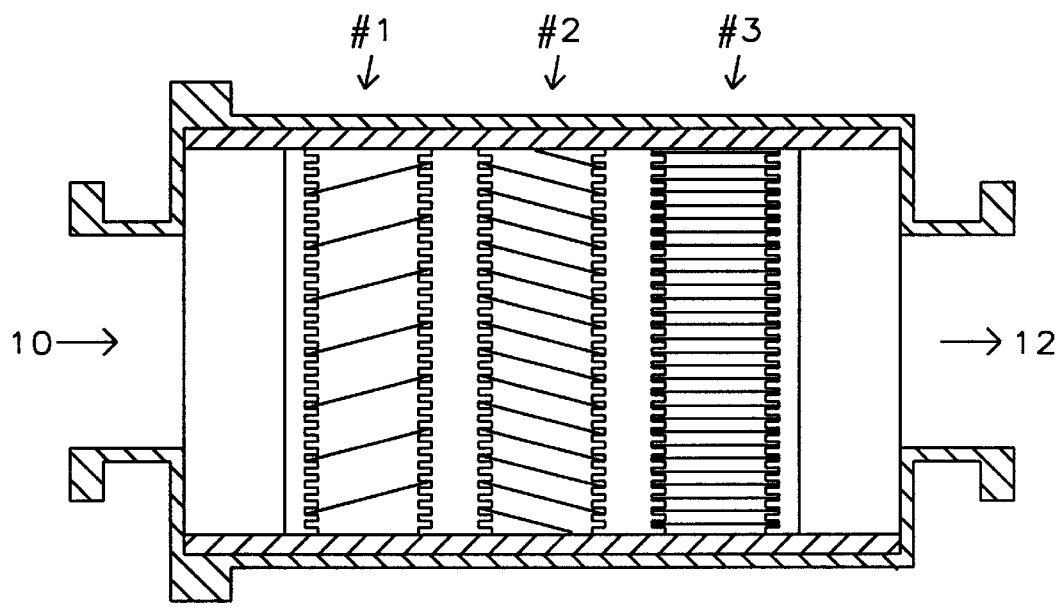
FIG. 2 shows a cross section of the three-stage plate arrangement of the cold trap of the invention.

FIG. 2 shows a cross section of the cold trap 18 that highlights the mounting of the three clusters of plates inside the cold trap. It is clear from the cross section that is shown in FIG. 2 that the interaction between the gas that passes through the cold trap varies significantly while the gas travels from point of entry 10 to point of exit 12 of the cold trap. The initial interaction is provided by cluster #1 where the concentration of the number of plates per unit of cubic content of the cold trap is low. The interaction of the cold trap with the gas that passes through the cold trap is therefore low when compared with the following clusters #2 and #3. The gas that passes through cluster #1 of the cold trap is however the gas that immediately preceding has been removed from a processing chamber and that therefore contains the highest concentration of particles and gasses that need to be removed. It is therefore clear that the maximum effectiveness of the cold trap exists during the time that the gas that needs to be purified passes through cluster #1 after which this effectiveness decreases while that gas passes through the subsequent clusters #2 and #3.

It must be pointed out with respect to the cross section that is shown in FIG. 2 that this cross section is taken through the geometric center of the cold trap whereby each of the plates that belongs to each of the three clusters of plates is also shown in cross section, a cross section that from each of the plates runs through the center of the plate. What is not obvious from this cross section is therefore the fact that the plates can have a different angle of incidence with the plane that is perpendicular with the plane of the crosscut. This should become clear from the cross section that is shown in FIG. 2 if one particular line that represents one plate from one of the three clusters is selected and if it is realized that the plane of the plate that belongs to that line can rotate around that line. This design aspect of the cold trap of the invention will become clear in further drawings. The exception to this observation is cluster #3, where the plates that are contained in this cluster are located in a plane that is perpendicular to the plane of the cross section of FIG. 2.

Figure 3:
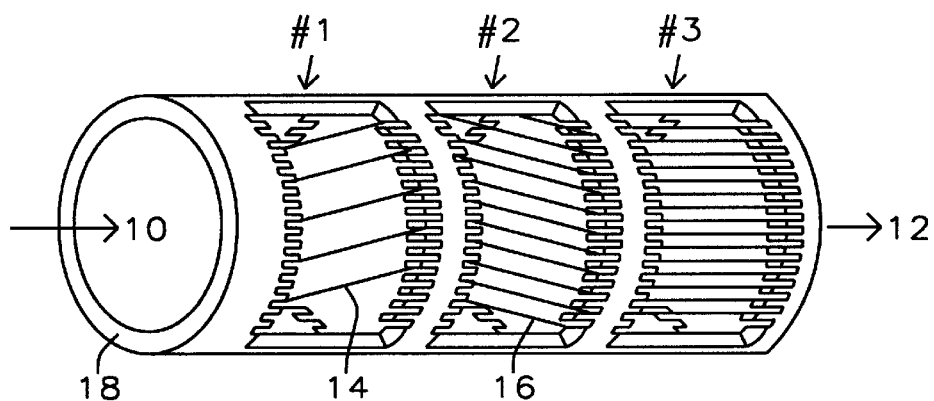
FIG. 3 shows a three dimensional view of the cold trap of the invention.

FIG. 3 shows a three dimensional side view of the cold trap of the invention. The entry point 10 of the gas that needs to be purified and the exit point 12 of this gas have been highlighted as have the tree cluster arrangements of the plates that are contained within the cold trap. From the three dimensional view of the cold trap that is shown in FIG. 3, the previously indicated phenomenon of the rotating or tilting of the plates that belong to the various clusters is somewhat more evident. The solid lines (for instance line 14 that belongs to cluster #1 and line 16 that belongs to cluster #2) are the outside edges of the plates where these outside edges intersect with the circumference of the drum 18. The cross sectional view that is shown in the following FIG. 4 highlights this design feature more clearly.

Figure 4:
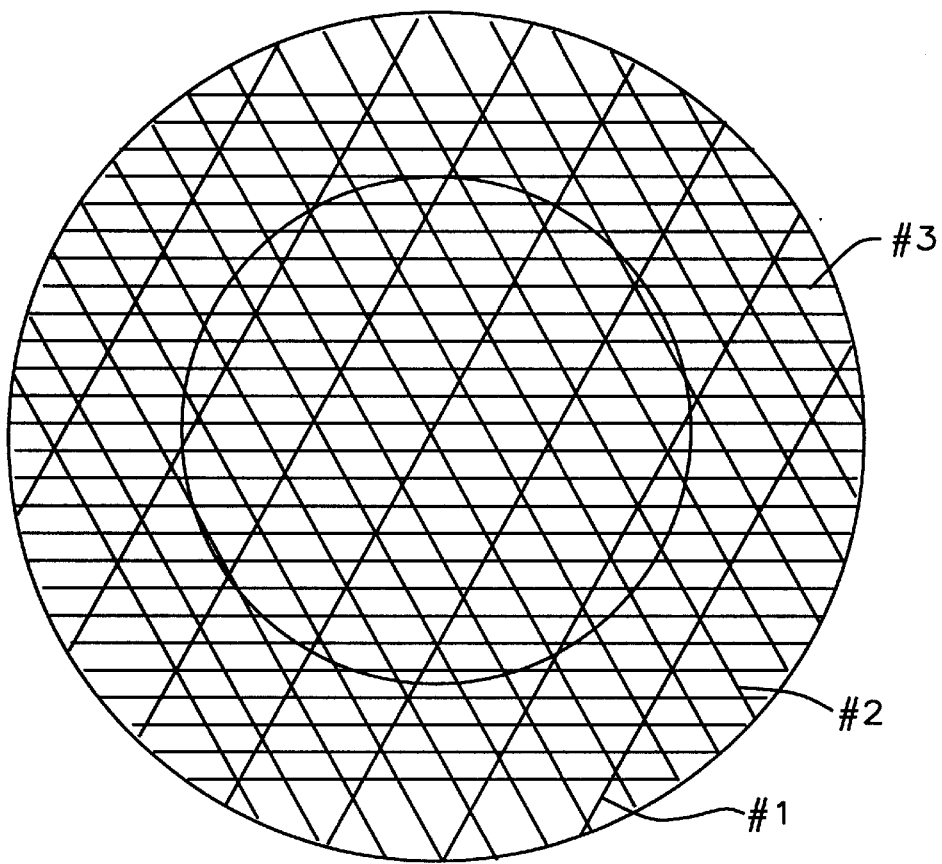
FIG. 4 shows a side view of the three-stage plate arrangement of the cold trap of the invention whereby this side view is taken when looking lengthwise through the cold trap of the invention.

FIG. 4 shows a cross section of the cold trap of the invention whereby this cross section is taken in a plane that is perpendicular with the longitudinal axis of the cold trap, that is in a plane that is perpendicular with the gas flow 10–12. From this cross section it is clear that the plates of the three different clusters are not only under a different angle as shown in FIG. 2 but are, in addition tilted is previously highlighted. The view that is shown in FIG. 4 can also be gained when looking at the cold trap in the direction 10–12, the three clusters of plates that have been highlighted as #1, #2 and #3 in FIG. 4 will then be shown as presented. It is clear that the plates that belong to cluster #3 are in a horizontal direction while plates that belong to cluster #1 intersect this horizontal direction under an angle of about 45 degrees and plates that belong to cluster #2 intersect this horizontal direction under an angle of about 135 degrees.

It is clear that the mounting apparatus 18 comprises a main cleaning chamber of cylindrical shape, which has a central axis. The central axis has a direction whereby the gas is advanced through the main cleaning chamber in the direction of the central axis while the cleaning plates are mounted in clusters #1, #2 and #3 inside the main cleaning chamber. A port of entry 10 of gas has been provided, which is a port through which the gas enters the main cleaning chamber. A port of exit 12 has been provided which is a port through which the gas exits the main cleaning chamber. A longitudinal cross section of the mounting apparatus 18 (not shown in FIG. 3) has a plane that contains the central axis. A vertical cross section (not shown in FIG. 3) has a plane that is perpendicular to the plane of the longitudinal cross section contains the central axis. A longitudinal or X direction (not shown in FIG. 3) is the direction of the central axis of the main cleaning chamber of cylindrical shape with a positive X direction being a direction that coincides with the direction of the gas flow from the entry port 10 to the exit port 12 of the main cleaning chamber. The mounting apparatus further has a horizontal or Y direction that is parallel to the plane of the longitudinal cross section and that is perpendicular to the central axis with a positive Y direction being a direction that is derived by a clockwise rotation of the positive X direction in the plane of the longitudinal cross section over an angle of 90 degrees. The mounting apparatus further has a vertical or Z direction that is parallel to the plane of the vertical cross section and that is perpendicular to the central axis, with a positive Z direction being a direction that is derived by a forward motion that is created by a corkscrew rotation from the positive Y to the positive X direction.

The cleaning plates that are part of clusters #1, #2 and #3 have a plane, this plane has a surface that has a geometric form that can be selected from a group comprising a square and a rectangle and a circle. The plane of the cleaning plates also have a geometric center that is either a point of intersect of diagonals of the square or rectangle or a center of the circle. A first geometric line can be drawn through the geometric center which has a direction that is either parallel to two opposing sides of the square or the rectangle or that is arbitrarily assigned across a surface of the circle. A second geometric line can be drawn through the geometric center, which has a direction that is perpendicular to the direction of the first geometric line.

The apparatus of the invention comprises, see FIG. 3, three clusters of cleaning plate. Each cluster contains a number of one or more of cleaning plates whereby all cleaning plates that constitute a cluster are in planes that are parallel with each. For cluster #1, a first geometric line of the cleaning plates is in the vertical cross section of the mounting apparatus, the direction of the first geometric line of the cleaning plates intersects with the direction of the central axis of the cleaning chamber of the mounting apparatus under a first angle with the positive X direction. This first angle is operationally adjustable. The direction of the second geometric line of the cleaning plates of cluster #1 intersects with the direction of the positive Z direction of the cleaning chamber of the mounting apparatus under a second angle, the second angle is operationally adjustable.

Cluster two contains a number of one or more cleaning plates. All cleaning plates that constitute cluster two are in planes that are parallel with each other whereby the number of cluster plates of cluster #2 is larger than the number of cluster plates in cluster #1, the first geometric line of the cleaning plates of cluster #2 is in the vertical cross section of the mounting apparatus. The direction of the first geometric line of the cleaning plates of cluster #2 intersects with the positive X direction of the cleaning chamber of the mounting apparatus under a third angle. This third angle is operationally adjustable. The direction of the second geometric line intersects with the positive Z direction of the cleaning chamber of the mounting apparatus under a fourth angle, this fourth angle is operationally adjustable.

Cluster #3 contains a number of one or more cleaning plates, all cleaning plates that constitute cluster three are in planes that are parallel with each other whereby the number of cleaning plates in cluster #3 is larger than the number of cleaning plates of cluster #2. The first geometric line of the cleaning plates of cluster #3 is in the vertical cross section of the mounting apparatus, the direction of the first geometric line of the cleaning plates of cluster #3 intersects with the positive X direction of the cleaning chamber of the mounting apparatus under a fifth angle, the fifth angle is operationally adjustable. The direction of the second geometric line of the cleaning plates of cluster #3 intersects with the positive Z direction of the cleaning chamber of the mounting apparatus under a sixth angle, this sixth angle is operationally adjustable.

It is clear that the apparatus of the invention is not limited to three clusters of cleaning plates but can contain a multiplicity of clusters of cleaning plates which can be numerically referred to as cluster number 1 through cluster number N in increments of 1. Cluster 1 is a cluster that is mounted closest to the port of entry point 10 of the gas into the apparatus of a cold trap. Each cluster of the multiplicity of clusters is mounted adjacent to a cluster that has a numerical reference number that differs from its adjacent number by no more than one. Clusters are mounted in incremental cluster number starting at the port of entry 10 of the gas into the apparatus of the cold trap. Each cluster of the multiplicity of clusters contains a number of one or more cleaning plates, whereby the number of cleaning plates increases for clusters of cleaning plates as these clusters are further removed from the port of entry point of the gas into the apparatus of the cold trap with a lower number of cleaning plates of two adjacent clusters being allocated to a cluster that is closest to the port of entry point of the gas into the apparatus of the cold trap. A first geometric line of the cleaning plates is in a vertical cross section of the mounting apparatus, the direction of the first geometric line of the cleaning plates intersects with a positive X direction of the cleaning chamber of the mounting apparatus under an first angle M, this first angle M is operationally adjustable. The direction of a second geometric line intersects with a positive Z direction of the cleaning chamber of the mounting apparatus under a second angle M, this second angle M is operationally adjustable.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. The apparatus of a cold trap that can be used for gas purification purposes, comprising:
   a multiplicity of cleaning plates, said multiplicity of cleaning plates comprising three clusters of cleaning plates hereby referred to as cluster one, cluster two and cluster three, said clusters one, two and three being mounted in a path of flow of said gas through said cold trap, said cluster one being mounted closest to a port of entry of said gas into said cold trap, said cluster three being mounted closest to a port of exit of said gas from said cold trap, said cluster two being mounted in between said cluster one and said cluster three, said cleaning plates having a plane, said plane comprising:
   (i) a surface having a geometric form that is selected from the group consisting of a square and a rectangle and a circle;
   (ii) a geometric center being a point of intersect of diagonals of said square or said rectangle or a center of said circle;
   (iii) a first geometric line through said geometric center having a direction that is either parallel to two opposing sides of said square or said rectangle or is arbitrarily assigned across a surface of said circle; and
   (iv) a second geometric line through said geometric center having a direction that is perpendicular to said direction of said first geometric line; and
   a mounting apparatus for mounting said cluster one, cluster two and cluster three of cleaning plates.

2. The apparatus of claim 1, said mounting apparatus for mounting said cluster one, cluster two and cluster three of cleaning plates comprising:
   a main cleaning chamber of cylindrical shape having a central axis, said central axis having a direction, said gas flowing through said main cleaning chamber in said direction of said central axis, said cleaning plates being mounted inside said main cleaning chamber;
   a port of entry of said gas which is a port through which said gas enters said main cleaning chamber;
   a port of exit of said gas which is a port through which said gas exits said main cleaning chamber;
   a longitudinal cross section having a plane comprising said central axis;
   a vertical cross section having a plane that is perpendicular to said plane of said longitudinal cross section, said vertical cross section comprising said central axis of said cleaning chamber;
   a longitudinal direction which is the direction of said central axis of said main cleaning chamber of cylindrical shape with a first direction being a direction that coincides with said direction of said gas flow from said entry port to said exit port of said main cleaning chamber;
   a horizontal direction that is parallel to said plane of said longitudinal cross section and that is furthermore perpendicular to said central axis with a second direction being a direction that is derived by a clockwise rotation of said first direction in said plane of said longitudinal cross section over an angle of 90 degrees; and
   a vertical direction that is parallel to said plane of said vertical cross section and that is furthermore perpendicular to said central axis with a third direction being a direction that is derived by a forward motion that is created by a corkscrew rotation from said second direction to said first direction.

3. The apparatus of claim 2, said cluster one comprising at least one of said cleaning plates henceforth referred to as a first number of cleaning plates, cleaning plates of cluster one being in parallel planes, said first geometric line of said cleaning plates being in said vertical cross section of said mounting apparatus, said direction of said first geometric line of said cleaning plates intersecting with said direction of said central axis of said cleaning chamber of said mounting apparatus under a first angle with said first positive direction, said first angle being operationally adjustable, said direction of said second geometric line intersecting with said direction of said third positive direction of said cleaning chamber of said mounting apparatus under a second angle, said second angle being operationally adjustable.

4. The apparatus of claim 2, said cluster two comprising at least one of said cleaning plates henceforth referred to as a second number of cleaning plates, all cleaning plates of cluster two being in parallel planes, said second number of cleaning plates being larger than said first number of cleaning plates by a measurable amount, said first geometric line of said cleaning plates of cluster two being in said vertical cross section of said mounting apparatus, said direction of said first geometric line of said cleaning plates of cluster two intersecting said first positive direction of said cleaning chamber of said mounting apparatus under a third angle, said third angle being operationally adjustable, said direction of said second geometric line of said cleaning plates of cluster two intersecting said third positive direction of said cleaning chamber of said mounting apparatus under a fourth angle, said fourth angle being operationally adjustable.

5. The apparatus of claim 2, said cluster three comprising at least one of said cleaning plates henceforth referred to as a third number of cleaning plates, all cleaning plates of cluster three being in parallel planes, said third number of cleaning plates being larger than said second number of cleaning plates by a measurable amount, said first geometric line of said cleaning plates of said cluster three being in said vertical cross section of said mounting apparatus, said direction of said first geometric line of said cleaning plates of said cluster three intersecting said first direction of said cleaning chamber of said mounting apparatus under a fifth angle, said fifth angle being operationally adjustable, said direction of said second geometric line of said cleaning plates of said cluster three intersecting said third direction of said cleaning chamber of said mounting apparatus under a sixth angle, said sixth angle being operationally adjustable.

* * * * *